(12) United States Patent
Brito

(10) Patent No.: US 6,771,480 B2
(45) Date of Patent: Aug. 3, 2004

(54) CIRCUIT TO SAMPLE AND COMPARE THE BEMF ON AN ACTUATOR INTO A CONSTANT VELOCITY CONTROL

(75) Inventor: Joao Carlos F. Brito, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/061,778

(22) Filed: Jan. 31, 2002

(65) Prior Publication Data

US 2003/0141836 A1 Jul. 31, 2003

(51) Int. Cl.[7] ............... H01H 47/32; G11B 21/02

(52) U.S. Cl. ............................ 361/159; 360/75

(58) Field of Search ................. 361/155, 156, 361/159, 160; 360/73.01, 73.03, 70, 75

(56) References Cited

U.S. PATENT DOCUMENTS

| 4,795,314 A | * | 1/1989 | Prybella et al. ............. 417/43 |
| 5,003,948 A | * | 4/1991 | Churchill et al. ........... 123/352 |
| 5,768,045 A | * | 6/1998 | Patton et al. ............. 360/78.04 |
| 6,184,645 B1 | | 2/2001 | Brito et al. |
| 6,204,629 B1 | * | 3/2001 | Rote et al. ................. 318/803 |
| 6,404,157 B1 | * | 6/2002 | Simon ...................... 318/445 |

* cited by examiner

*Primary Examiner*—Gregory J. Toatley, Jr.
*Assistant Examiner*—Danny Nguyen
(74) *Attorney, Agent, or Firm*—W. Daniel Swayze, Jr.; W. James Brady; Frederick J. Telecky, Jr.

(57) ABSTRACT

A apparatus for controlling an actuator including, an integrator circuit to generate an integrated signal to be represented by a back EMF voltage, a amount circuit to generate a amount signal to indicate the amount to raise or lower the integrated voltage, a direction circuit to generate a direction signal to raise or lower the back EMF voltage, a comparator circuit to compare said integrated voltage with the back EMF voltage, and a switch circuit to add and subtract the amount signal with the integrated voltage in accordance with the direction signal.

4 Claims, 6 Drawing Sheets

CIRCUIT TO SAMPLE AND COMPARE THE BEMF ON AN ACTUATOR INTO A CONSTANT VELOCITY CONTROL

FIELD OF THE INVENTION

The present invention relates in general to control of an actuator and, more particularly, to a method and apparatus accurately controlling the velocity of the actuator member by monitoring the back electromotive force ("EMF") of a actuator coil, and driving the coil with a voltage.

BACKGROUND OF THE INVENTION

Conventional actuators sometimes referred to as "motors", have a movably supported member and a coil. When a current is passed through the coil, a motive force is exerted on the member. A control circuit is coupled to the coil in order to controllably supply current to the coil. One example of such an arrangement is found in a hard disk drive, where the movable member of the actuator supports a read/write head adjacent a rotating magnetic disk for approximately radial movement of the head relative to the disk. There are situations in which it is desirable to move the member to one end of its path of travel at a predetermined velocity which is less than its maximum velocity. An example of such a situation is a power failure. In such a situation, it is desirable to move the member to a parking location, where it is held against potentially damaging movement which could occur if the member were not so parked. The movement of the member to the parking location is commonly referred to as a retract of the member.

When a current is applied to the coil of the actuator, the member is subjected to a force tending to accelerate the member at a rate defined by the magnitude of the current, and in a direction defined by the polarity of the current. Consequently, in order to accelerate or decelerate the member until it is moving at a desired velocity and in a desired direction, it is important to know the actual direction and velocity of the member. In this regard, it is known that the back-EMF voltage on the coil of the actuator is representative of the velocity and direction of movement of the member. Specifically, the following relationship applies to actuators:

$V_M = I_M * R_M + K_e \omega$ $V_M$=voltage across actuator (motor), $I_M$=current through actuator $R_M$=internal resistance of actuator $K_e$=torque constant of actuator, and $\omega$=velocity of actuator.

The term, $K_e \omega$, represents the back-EMF of the actuator coil.

Apparatus have been provided that control such actuators by providing a drive current to the coil of the actuator in response to the provision of a target speed voltage signal having a voltage corresponding to the target speed of the moveable member. For example, co-pending patent application U.S. Pat. No. 6,040,671, issued on Mar. 21, 2000, and entitled "CONSTANT VELOCITY CONTROL FOR AN ACTUATOR USING SAMPLED BACK EMF CONTROL," discloses such an apparatus. However, such apparatus does not lend itself readily to providing such control in cases where the drive transistors for the actuator are power MOSFETs external to the integrated circuit ("IC") containing the control circuitry. In such cases, it is difficult and/or expensive to implement a current mode output. To do so would require current feedback. To process this feedback, additional circuitry would be required. This additional circuitry would add expense and would be difficult to operate at low voltages such as experienced with the power failure.

FIG. 1 is a diagrammatic view of a system including an actuator 10 under control of a control circuit 12. The particular system shown is that of a hard disk drive, in which the actuator 10 controls the movement of a member 20 on which a read/write head 34 is mounted. The control circuit 12 applies drive signals DRV+ on line 14 and DRV- on line 16 in response to a move command voltage signal $V_C$ on line 18. The drive signals DRV+ and DRV- cause motion in a member 20 of actuator 10 by setting up a force field in a coil 22 on the member 20. The force field thus set up in coil 22 interacts with the magnetic field of a permanent magnet 24 disposed nearby. Member 20 is constrained to move about a shaft 26, resulting in pivoting motion as shown by arrow 28. The member is constrained in its movement between a first stop 30 and a second stop 32. The result is that a magnetic head 34 is caused to move about a magnetic disk (not shown in this figure) in conjunction with the reading and writing of data from and to the magnetic disk in a hard drive system.

FIG. 2 is a high-level block diagram of a control unit and the actuator it controls, such as is used in the system shown in FIG. 1. A control circuit 90 receives a move command signal $V_C$ on line 92 and provides drive current DRV+ and DRV- to an actuator. In FIG. 2, the actuator shown is an idealized model 65 of an actuator. It will be appreciated that the control circuit 90 would be unable to "see" a significant difference between the actuator model 65 and an actual actuator, were an actual actuator connected to control circuit 90.

The actuator model 65 includes an ideal current sensor 66, an inductance 68, a resistance 70 and an ideal voltage-controlled voltage source 72, all coupled in series between the two terminals 94, 96 of the actuator model 65. The output 67 of the ideal current sensor 66 is a signal representing the current flowing through the actuator. This signal 67 is coupled to an input of an amplifier 74, which has a gain $K_t$ that represents a torque constant of the moveable member 20 (FIG. 1). The output of the amplifier 74 is coupled to the input of a junction 76, which adjusts the amplifier output using a signal representing a load torque. The output of junction 76 is coupled to the input of a circuit 78, which makes an adjustment representative of the inertia J, of the member 20.

The output 80 of the circuit 78 is a signal which represents an acceleration of the member 20. The signal 80 is integrated at 82, in order to obtain a signal 84 which represents the velocity of the member 20. The signal 84 is applied to the input of an amplifier 86 having a gain $K_e$ that represents an electrical constant for the back-electromotive force (EMF) of the actuator. The output 88 of the amplifier 86 is a voltage $V_{be}$ which represents the back-EMF voltage of the actuator. This voltage is applied to an input of the ideal voltage-controlled voltage source 72, which reproduces this same voltage $V_{be}$ across its output terminals. Since the voltage source 72 is ideal, it produces the output voltage regardless of whether there is any current flowing through source 72.

Since the signal 84 represents the actual velocity of the member 20, and since the back-EMV voltage $V_{be}$ present at 88 and across source 72 is proportional to the magnitude of signal 84, it will be appreciated at the magnitude of the back-EMF voltage $V_{be}$ across source 72 is an accurate representation of the actual velocity of the member 20. However, when a current is flowing through the actuator model 65, the resistance 70 produces a voltage which is added to the voltage $V_{be}$ across the voltage source 72. Consequently, so long as current is flowing through the actuator model 65, it is not possible to accurately measure the voltage $V_{be}$ alone, in order to accurately determine the actual velocity of the movable member.

Therefore, the system of FIG. 2 independently measures the back-EMF voltage $V_{be}$, and thus determines the actual velocity of the member 20. It does this by interrupting the current flow through the actuator coil 68 so that the voltage across the resistance 70 goes substantially to zero, after which the back-EMF voltage $V_{be}$ is measured across the two terminals 94, 96, of the actuator model 65. It is a characteristic of the actuator that the back-EMF voltage $V_{be}$ does not change rapidly after the current flow through the actuator model 65 is decreased to zero, once short term transient effects have died down.

The control circuit 90 includes the following components. A junction 98 receives the retract command voltage signal $V_C$ on line 92 that corresponds to a target velocity for the actuator member 20. The output of junction 98 is provided to a proportional compensation unit 100 that provides a proportional amplification to the input provided thereto. Thus, the output of unit 100 is some multiple of the input, i.e., unit 100 is substantially a linear amplifier. Of course, the proportional factor in unit 100 may be one, in which case the output would be the same as the input.

The output of terminal 98 is also provided to an integral compensation unit 102, which provides a mathematical integration operation on its input to derive its output. The output of unit 100 provided to one input of terminal 104, while the output of unit 102 is provided to another input of terminal 104. The outputs of units 100 and 102 are added in terminal 104, and the output, which is a voltage the level of which represents a commanded current level, $I_{CMD}$, is provided on line 106 to a transconductance linear amplifier 108. The outputs of amplifier 108 are the differential drive currents DRV+ and DRV− which are provided on lines 110 and 112, respectively. The DRV+ signal is synchronous with a DRIVE control signal. Lines 110 and 112 are provided to input terminals 94 and 96, respectively, of the actuator model 65. Lines 110 and 112 are also connected to the differential inputs of a voltage sense unit 116. The output of the voltage sense unit 116 is provided to a sampler unit 118. A timer 120 generates two timing signals, a FLOAT timing signal which is applied to transconductance amplifier 108 and a SAMPLE timing signal which is applied to sampler unit 118. The output of sampler unit 118, on line 122 is provided to a second input to terminal 98. The signal on line 122 is subtracted from the signal on line 92 in terminal 98.

The operation of the control circuit 90 of FIG. 2 may be better understood by reference to the signal timing diagram shown in FIG. 3. FIG. 3 shows the FLOAT timing signal, the SAMPLE timing signal, and the DRIVE signal, all mentioned above. These three signals are presented along a common horizontal time axis, and so their relative timings may be easily seen. As can be seen in FIG. 3, the FLOAT signal is a regularly recurring rectangular pulse. Looking now at one set of pulse signals, at timing 130 the FLOAT signal begins.

This causes amplifier 108 (FIG. 2) to turn off the drive signals, as can be seen by looking at the signal DRIVE in FIG. 3. After sufficient time for the transient effects in inductor 68 (FIG. 2) of the actuator to die down, at timing 132, a SAMPLE pulse begins. A SAMPLE pulse is provided for a sufficiently long period of time to enable the sampler unit 118 (FIG. 2) to sense the voltage at the output of amplifier 116. At time 134 the SAMPLE pulse ceases. After a small delay, at time 136, the FLOAT signal ends. A short time thereafter, at time 138, the drive signals resume. The sequence thus described repeats regularly.

Thus, in operation, the command voltage $V_C$ is provided on line 92 to terminal 98. There, it is combined with a voltage on line 122. The output of terminal 98 is provided to the proportional compensation unit 100 and integral compensation unit 102, the outputs of which are combined in terminal 104 to yield the current command signal $I_{CMD}$. The current command signal $I_{CMD}$ is converted into actual drive currents by the transconductance amplifier 108, to yield the drive currents DRV+ and DRV− which are applied to the terminals 94 and 96, respectively, on the actuator model 65. At the same time, the voltage across terminals 94 and 96 is sensed by voltage sense unit 116. The timer unit 120 applies the FLOAT signal to amplifier 108, thus interrupting the drive current, a short time after which the SAMPLE signal is provided to sampler unit 118, which samples and stores the voltage output from voltage sense unit 116, thus the back-EMF voltage, undisturbed by voltage effects produced by the application of the drive currents, is sensed and stored in the sampler unit 118 on a regularly occurring basis. This sampled and held voltage is provided on line 122 to the terminal 98 where it is subtracted from the command voltage $V_{CMD}$ to yield a feedback-corrected control voltage.

The feedback-corrected command voltage is then applied to the proportional compensation unit 100 and the integral compensation unit 102. As mentioned above, the proportional compensation unit 100 provides an output that is some multiple of its input. This multiple may be unity. The purpose of the proportional compensation unit 100 is to shape $I_{CMD}$ so as to enable the control circuit 90 to respond better to large errors in the actual velocity, as compared with the desired, commanded velocity, while ensuring stability in the control circuit 90. This is desired because, for example, in a retract operation, the situation in which the retract is initiated may be in the middle of a hard drive "hard seek" operation. In a hard seek; the actuator coil is driven to the point of maximum velocity so as to rapidly move the head to a desired track on the hard drive. The voltage corresponding to this velocity might be, say, 7 Volts. By contrast, an exemplary voltage corresponding to a desired retract operation speed may be, say, one volt. The proportional compensation unit 100 allows the control circuit 90 to immediately respond to this wide disparity between actual speed and desired speed, without destabilizing the system. In selecting a suitable value for the proportional amplification factor, the practitioner should keep stability foremost, and set a bandwidth that is significantly less than the frequency of the SAMPLE signal pulses, while allowing relatively quick control of the actuator.

The integral compensation unit 102, as mentioned above, provides a mathematical integration operation on its input to derive its output. Thus, its response is slower than the proportional compensation unit 100, and is unsuitable for reliance to respond to large errors in velocity, such as described above. This is why the proportional compensation unit 100 is provided. However, the proportional compensation unit 100 is not optimal for response to large changes in the torque load that the actuator member may encounter. In such situations, the proportional compensation unit 100 is inadequate to maintain the desired relatively constant velocity. By contrast, the integral compensation unit 102 does respond well to even large and abrupt changes in torque load. When such a large torque load change is encountered, the integral compensation unit 102 gradually integrates the change in resultant velocity that the torque load change is inducing, and steadily increases the compensating current command to maintain the velocity constant. The result is adequate magnitude compensating current command, without destabilization of the control circuit 90. The control circuit 90 has another implementation presented on FIG. 4. The FIG. 5 illustrated a possible circuit diagram for the solution presented in FIG. 4.

The circuit of FIG. 5 employs two capacitors namely capacitor 294 and capacitor 316. These two capacitors 294 and 316 use a lot of area when formed on a semiconductor device. Additionally, each capacitor 294 and capacitor 316 requires a set of switches to switch the capacitors 294 and 316 in and out. This causes charge loss and as a consequence of the charge loss causes large errors.

Accordingly, it is desired to have an apparatus that controls actuators using a voltage mode output. Such a configuration would eliminate the requirement for current sensing and should, therefore, be simpler and less expensive to build.

SUMMARY OF THE INVENTION

The present invention reduces the number of capacitors needed in a control circuit to one and consequently reduces the amount of the area on an integrated circuit. Additionally, the present invention reduces the voltage requirements of the control circuit because it reduces the charge loss by use of a single capacitor. Using more than one capacitor increases the number of capacitors and correspondingly the charge loss. The single capacitor holds the delta or difference voltage and not the plus and minus voltage on separate capacitors.

DETAILED DESCRIPTION OF THE DRAWINGS

Figure 1:
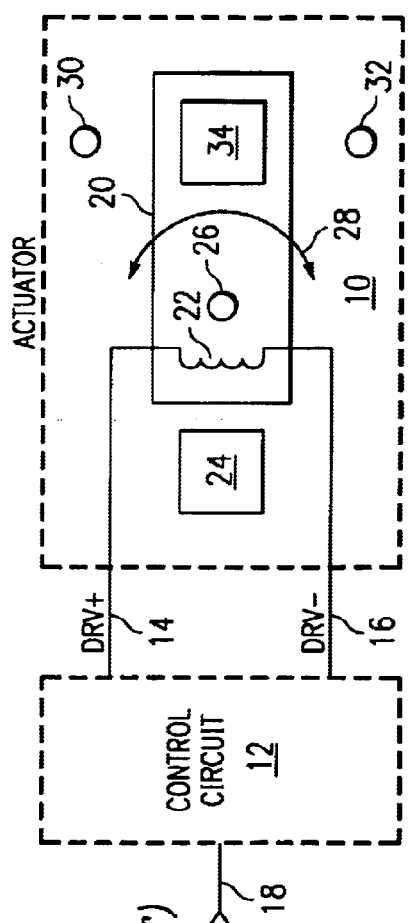
FIG. 1 is a diagram of an actuator control system.
Figure 2:
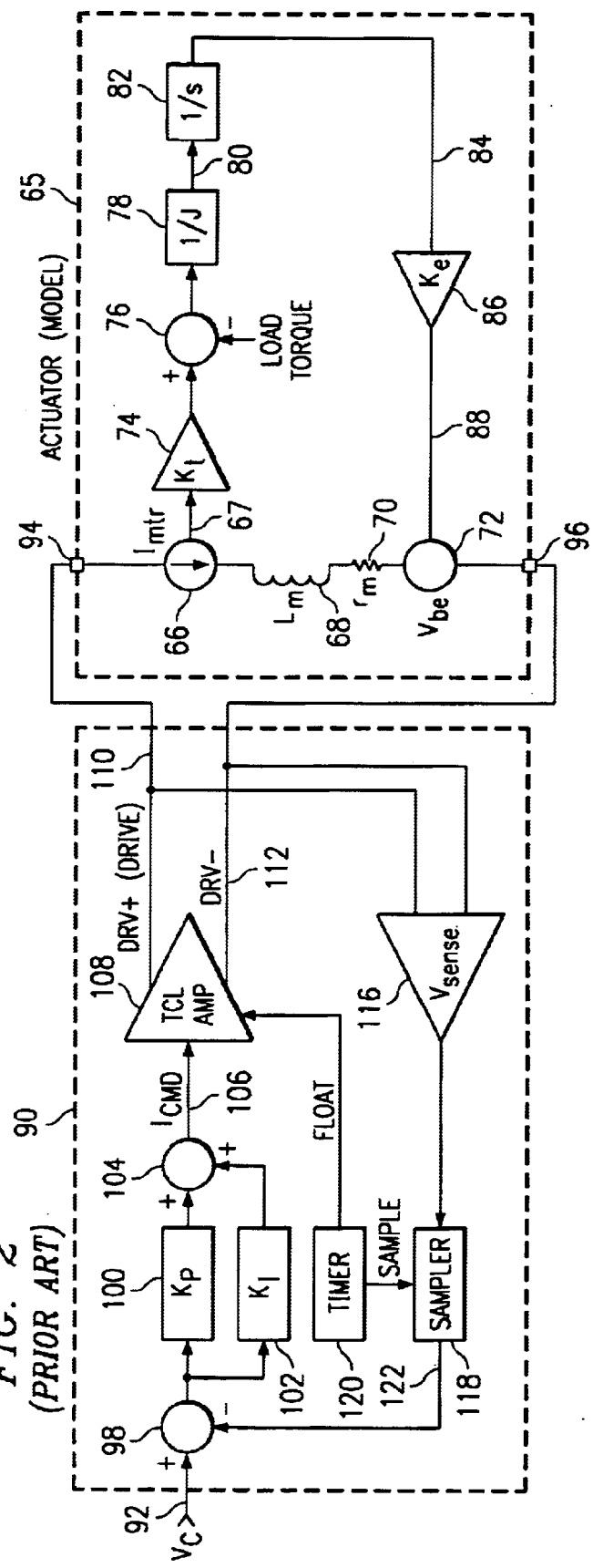
FIG. 2 is a block diagram of a control unit for the system.
Figure 3:
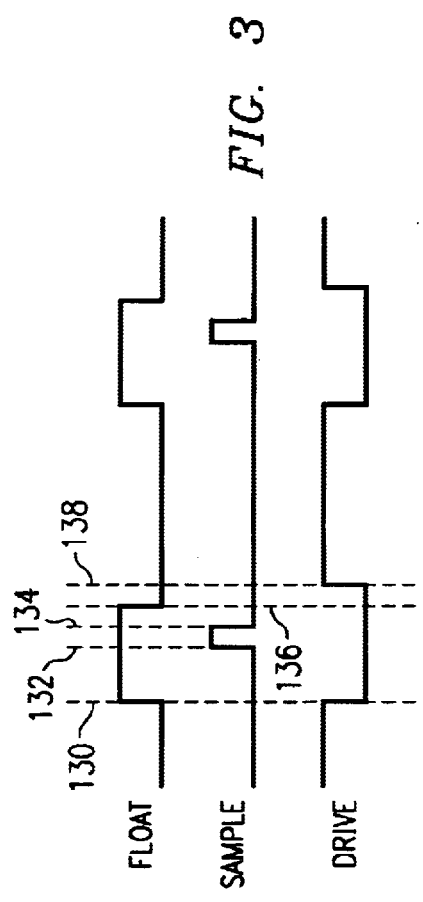
FIG. 3 is a timing diagram for signals in FIG. 2.
Figure 4:
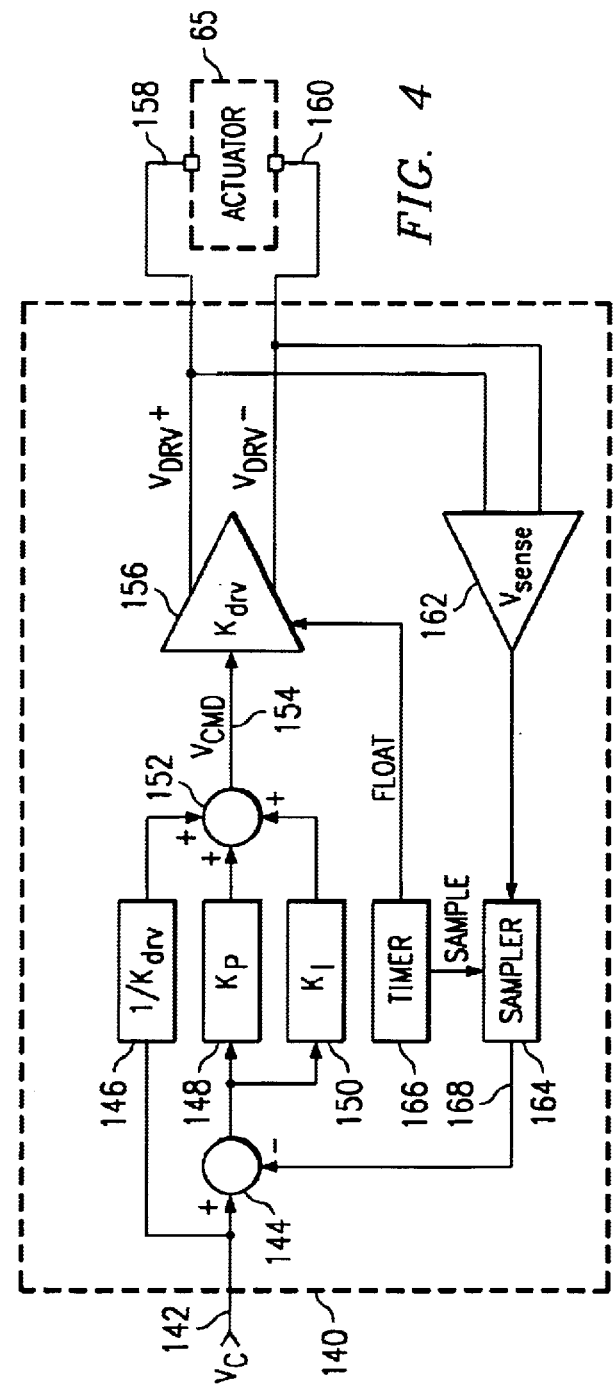
FIG. 4 is a block diagram of a control unit of FIG. 2 but with a different output drive.
Figure 5:
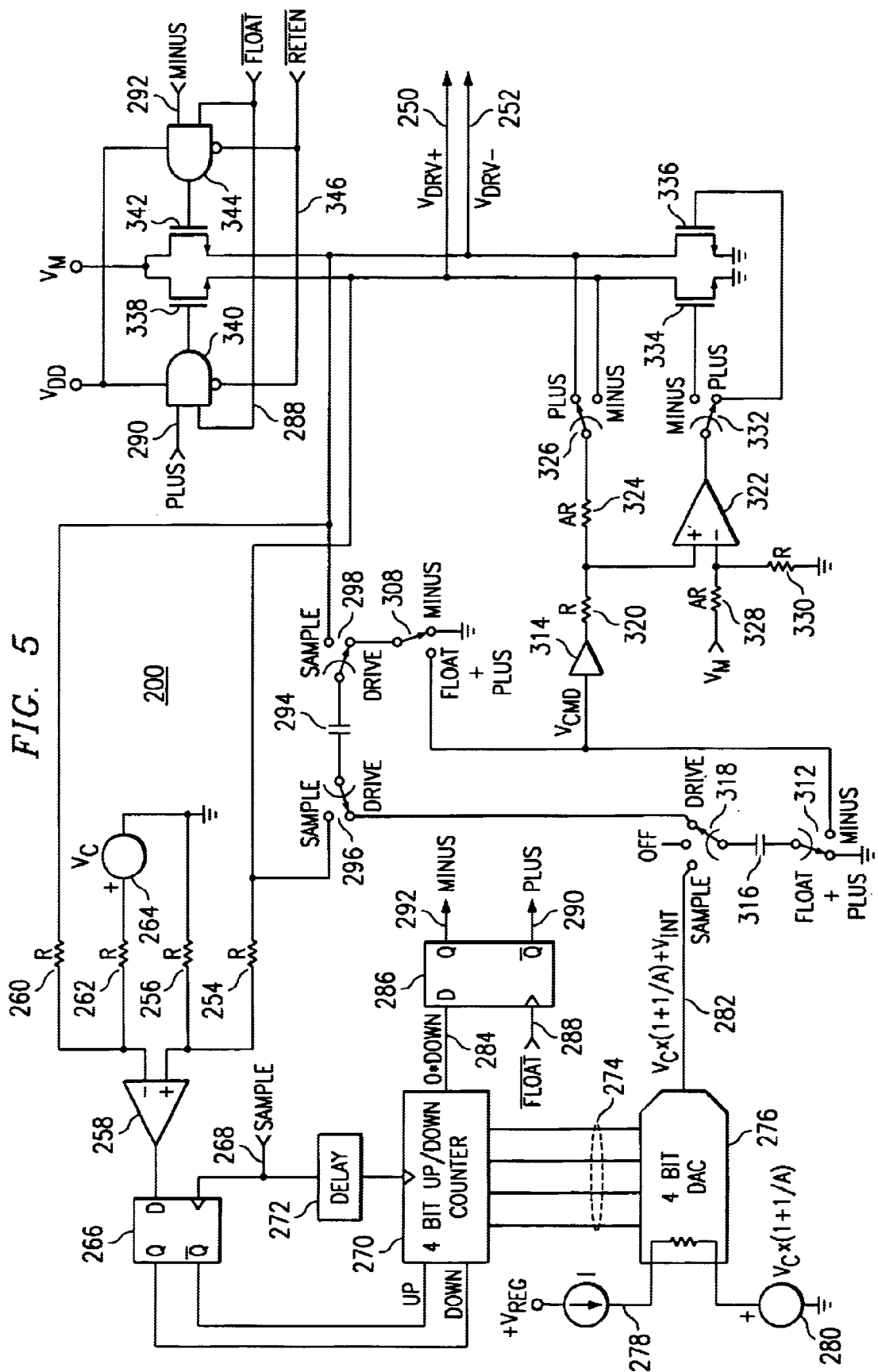
FIG. 5 is a circuit diagram of a control circuit.
Figure 6:
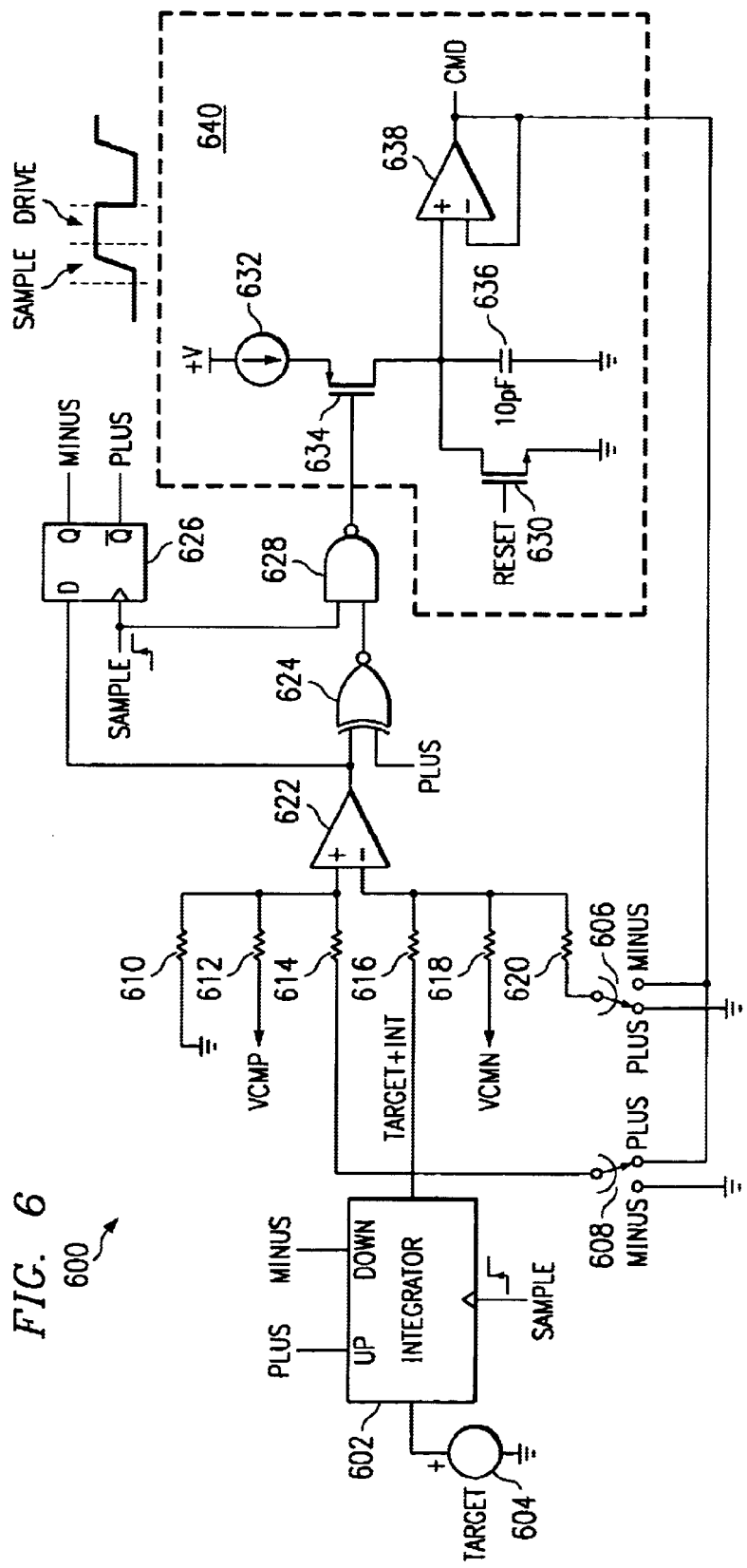
FIG. 6 illustrates a circuit diagram of a control circuit in accordance with the present invention.

Turning now to FIG. 6, a control circuit 600 of the present invention is illustrated. A voltage generator 604 generates a target voltage which is input to integrator 602. The integrator 602, which may be an up/down counter used in conjunction with a DAC, generates a target voltage which is adjusted by an integrated amount represented by INT voltage. The plus signal when a logical one is input to have the up/down counter count up and the minus signal when a logical one is input to have the up/down counter count down. The plus and minus signals are generated by the flip/flop 626. Thus, flip/flop 626 is a direction circuit to indicate the direction of the Bemf, more specifically to raise or lower the back Bemf voltage. Additionally, the integrator 602 is clocked by a sample signal. The output of integrator 602 is input to resistor 616 which is connected to resistor 618 and resistor 620. The other end of resistors 616, 618, and 620 are connected to the negative input of comparator 622. Another end of resistor 618 is connected to receive voltage $V_{CMN}$.

The resistor 620 is connected to switch 606; the switch 606 is controlled by the plus signal or the minus signal. The plus signal (meaning a logical one plus signal) indicates that the Bemf is less than the output of integrator 602 and a minus signal indicates that the Bemf is greater than the output of integrator 602. If there is a plus signal, resistor 620 is connected to ground. However, if there is a minus signal then the resistor 620 is connected to the output of amplifier 631 to receive the voltage signal $V_{CMD}$. Likewise, resistor 614 is connected to switch 608 which is controlled again by the plus signal or minus signal. With a plus signal, the resistor 614 is connected to amplifier 631 to receive the signal $V_{CMD}$. Each of resistors 610, 612, and 614 is connected to the plus input of comparator 622. The other end of resistor 610 is connected to ground. The other end of resistor 612 is connected to receive voltage VCMP. Thus, the comparator 622 compares the back-EMF Bemf which is the voltage $V_{CMP}$–voltage $V_{CMN}$ with the target voltage plus the integrated voltage as the output of integrator 602 and plus or minus signal (±) the voltage $V_{CMD}$. The plus or minus sign (±) is in accordance with the plus or minus signal. If there is a plus signal, then the target plus integrated voltage is reduced by voltage $V_{CMN}$, and if there is a minus signal, then the target plus integrated voltage is increased by voltage $V_{CMD}$. The output of comparator 622 outputs an indication of whether the back-EMF voltage is too high and should be reduced or whether the back-EMF voltage is too low and should be increased. Capacitor 636 is charged to an amount that the back-EMF voltages are to be raised or lowered by the amount of time that capacitor 636 is permitted to be charged. Capacitor 636 will be charged until the voltage VCMD is equal to the absolute difference of the back-EMF Bemf, which is the voltage VCMP minus voltage VCMN, and the target voltage plus the integrator voltage. The output of comparator 622 changes polarity to turn off PFET 634 to stop the charging, and the plus signal indicates the output of comparator 622 is zero. If the output of comparator 622 is one, then the minus signal is asserted. The output of comparator 622 is input to exclusive nor circuit 624. Additionally, input to exclusive nor circuit 624 is the plus signal. The output of the exclusive nor circuit 624 is input to NAND circuit 628. The other input of NAND circuit 628 is connected to receive the sample signal. The output of NAND circuit 628 is to switch 634, shown as a PFET. The PFET 634 has a source connected to constant current source 632. The drain of PFET 634 is connected to capacitor 636, which may be 10 pF. The capacitor 636 holds the difference of voltage between the Bemf and the target and integrated voltage. The voltage on capacitor 636 is generated by the current received from current source 632 when the switch 634 is operated to allow current to flow from source to drain. The sample signal is input as a clock to the flip/flop 626. The flip/flop 626 produces the minus signal and the plus signal out of the q and $\bar{q}$ output respectively. The NFET 630 is connected in parallel to capacitor 636 and connected is to ground. The NFET 630 is connected to receive the reset signal to the gate of NFET 630 such that when the reset signal is received the capacitor 636 is shorted to ground the NFET acts as a switch to short to capacitor 636 to ground.

An amount circuit includes amplifier 631, switch 634, capacitor 636, switch 630 and current source 632 to generate an amount signal, which is in the present embodiment voltage $V_{CMD}$ to indicate the amount to be applied at the actuator.

The operation of the control circuit 600 shown in FIG. 6 is described in conjunction with the waveform diagram of FIG. 7. FIG. 7A illustrates the various periods of time associated with the operation of the actuator. Starting at the top of the figure, the break signal is shown. After a break period, which is initiated for convenience at time zero, the actuator enters a float period. During the float period no energy is applied to the coils of actuator and the float signal alternates with a drive signal where energy is applied to the coils to move the actuator. The float signal is to allowing various measurements to be made such as position, and the drive signal is to drive the actuator in accordance with the measurements that have been made. The float signal corresponds to a sample period and to a reset period as illustrated in FIG. 7A. A reset period is to reset the capacitor 636 to zero voltage. After the reset period, the sample period begins. The sample signal corresponds to determining the direction and magnitude of the error. The sample signal is input to the flip/flop 626 and NAND circuit 628. The discharge of capacitor 636 is ended by the opening of NFET 630, eliminating the path to ground. The back-EMF voltage is measured which is equal to voltage $V_{CMP}$–voltage $V_{CMN}$. The target voltage plus integrated voltage is summed with the voltage $V_{CMN}$ and input to the comparator 622. The output is positive which generates the minus signal in flip/flop 626. Switch 606 connects to apply voltage $V_{CMD}$ to resistor 620 as a result of minus signal, and switch 608 connects ground to resistor 614 to balance the input of the comparator 622. The comparator 622 has the following two functions:

1) When the signal RESET is high it compares the Bemf (VCMP–VCMN) with TARGET+INT. The signal CMD from the amplifier 631 is always zero because the NMOS 630 is on keeping the capacitor 636 discharged. The output will be latched at the flip-flop 626 at the rising edge of the SAMPLE signal.

2) When the signal SAMPLE is high it compares the Bemf (VCMP–VCMN) with TARGET+INT plus or minus the signal CMD from the amplifier 631. The NMOS 630 is off, letting the capacitor 636 be charged until CMD is equal to the difference between Bemf and TARGET+INT. When the voltage CMD is equal to the difference between Bemf and TARGET+INT, the output of the comparator 622 will change, the exclusive NOR 624 will change, the NAND 628 will change and the transistor PMOS 634 will turn off stopping the charge of the capacitor 636.

The voltage $V_{CMP}$ is also input to comparator 622 for a comparison with the voltage $V_{CMN}$ which is added to the target voltage and integrated voltage. A comparison signal is output from the output of comparator 622. If a logical one as the comparison signal is output from comparator, voltage $V_{CMP}$ is greater than the sum of voltage $V_{CMN}$ plus the target voltage and integrated voltage. This indicates that the back-EMF voltage is too high and should be reduced. The flip/flop 626 receives the comparison signal, a logical one, and outputs from the Q output a logical one as the minus signal which indicates that a reduction of the Bemf is required. The integrator 602 receives the minus signal and begins counting down to reduce the target voltage. The integrator counts down as long as the sample signal is present. Since the output of comparator 622 is one and the plus signal is zero, the output of exclusive nor circuit 624 is zero. The output of NAND circuit 628 is one and consequently, the switch 634 opens and the capacitor 636 is not charged. A reset period is entered, and the charge on the capacitor is reduced to zero by closing switch 630. The sample period is again entered, and the back-EMF is measured and correspondingly the back-EMF is significantly less since the capacitor 630 has not been charged up. Now, the comparator 622 compares a reduced target voltage and integrated voltage and the voltage $V_{CMP}$ with the voltage $V_{CMD}$ and voltage $V_{CMN}$. The comparator 622 now outputs a zero as a comparison signal to indicate that the Bemf is too low and should be raised. The exclusive nor circuit 624 outputs a one because the zero output from comparator 622 and the plus signal are both zero. The NAND gate 628 outputs a zero because both the inputs to the NAND gate 628 are one. During a sample period the sample signal is logical one and the output of the exclusive nor circuit is logical one. The capacitor 636 is charged up from the current from current source 632 because the switch 634 is closed. Additionally, since the output of comparator 622 is zero, the flip/flop 626 outputs a zero for the minus signal (Q) and a one for the plus signal ($\overline{Q}$). In response to the changed minus signal and plus signal, the switch 608 switches to receive the output of comparator 634, namely voltage $V_{CMD}$ and the switch 606 switches so that the resistor 620 is connected to ground. Thus, the voltage $V_{CMD}$ is transferred from the negative input of comparator 622 to the positive input of comparator 622.

Figure 7A:
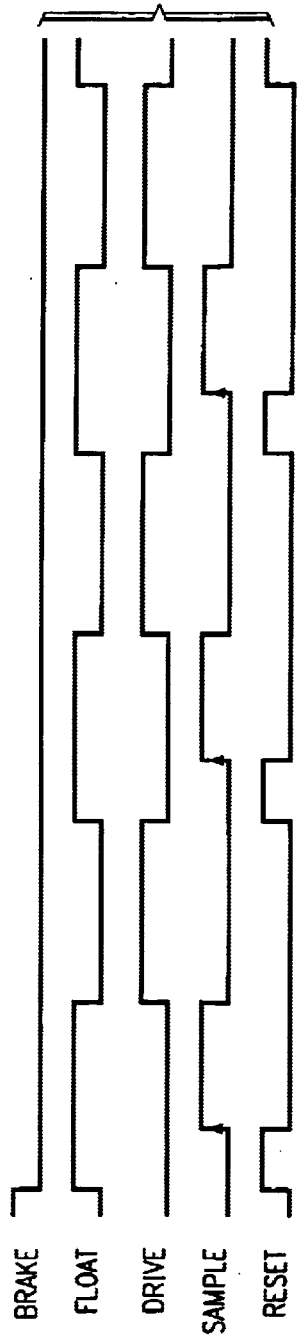
FIG. 7 illustrates a timing circuit in accordance with the circuit diagram of FIG. 6.
Figure 7B:
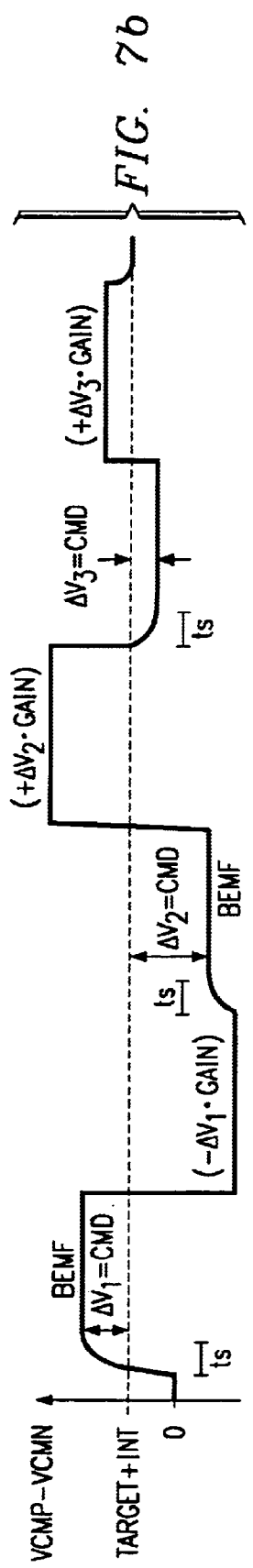

FIG. 7b illustrates the back-EMF voltage as a function of time. During this first sample period as shown in FIG. 7a, the back-EMF voltage is above the target voltage and INT voltage by an amount $V_{CMD}$ which is output from amplifier 631; during the second sample period, the back-EMF voltage is under the target voltage plus integrated voltage by an amount $V_{CMD}$. This process continues alternating between the target and INT voltage.

Figure 7C:
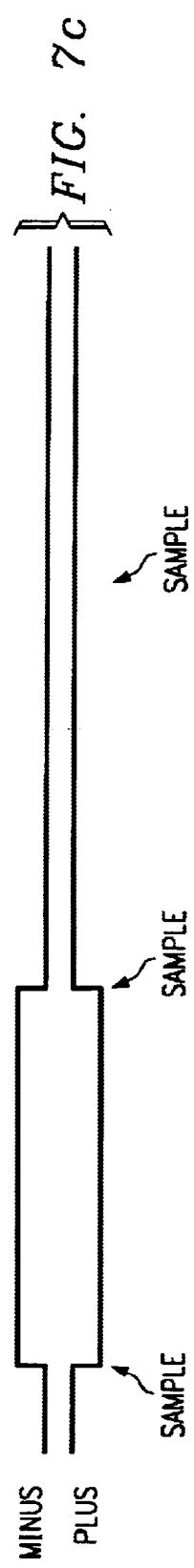

FIG. 7c illustrates the change in the minus signal and the plus signal. The minus signal is '1' during the first sample and continues to '1' until the beginning of the second sample period. Likewise at the beginning of the second sample period, the plus signal is a '1' and the minus signal goes to zero. The minus signal indicates the Bemf voltage is too high and should be reduced. The plus signal indicates that the Bemf is too low and should be raised.

Figure 7D:
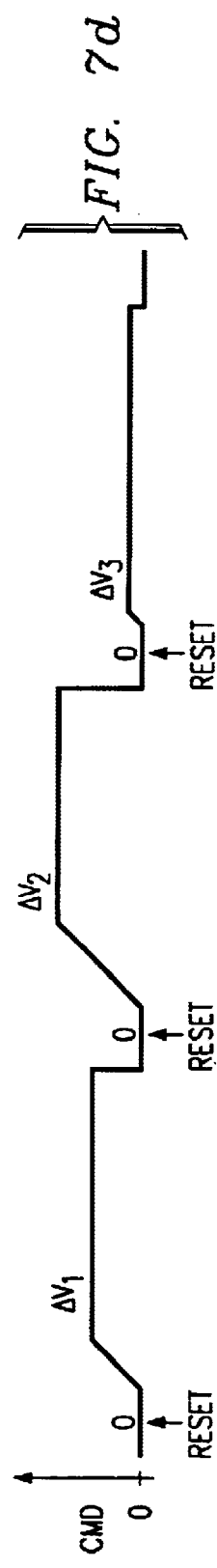

FIG. 7d illustrates the voltage across the capacitor 636. During reset periods, the voltage is zero. During sample periods, the voltage is equal to the amount of adjustment that is required for the back-EMF voltage. A separate signal, the plus or minus signal, to indicate plus or minus raise or lower, such as illustrated in FIG. 7c, is used in conjunction with the voltage $V_{CMD}$ to eliminate one capacitor from the control circuit.

Figure 8:
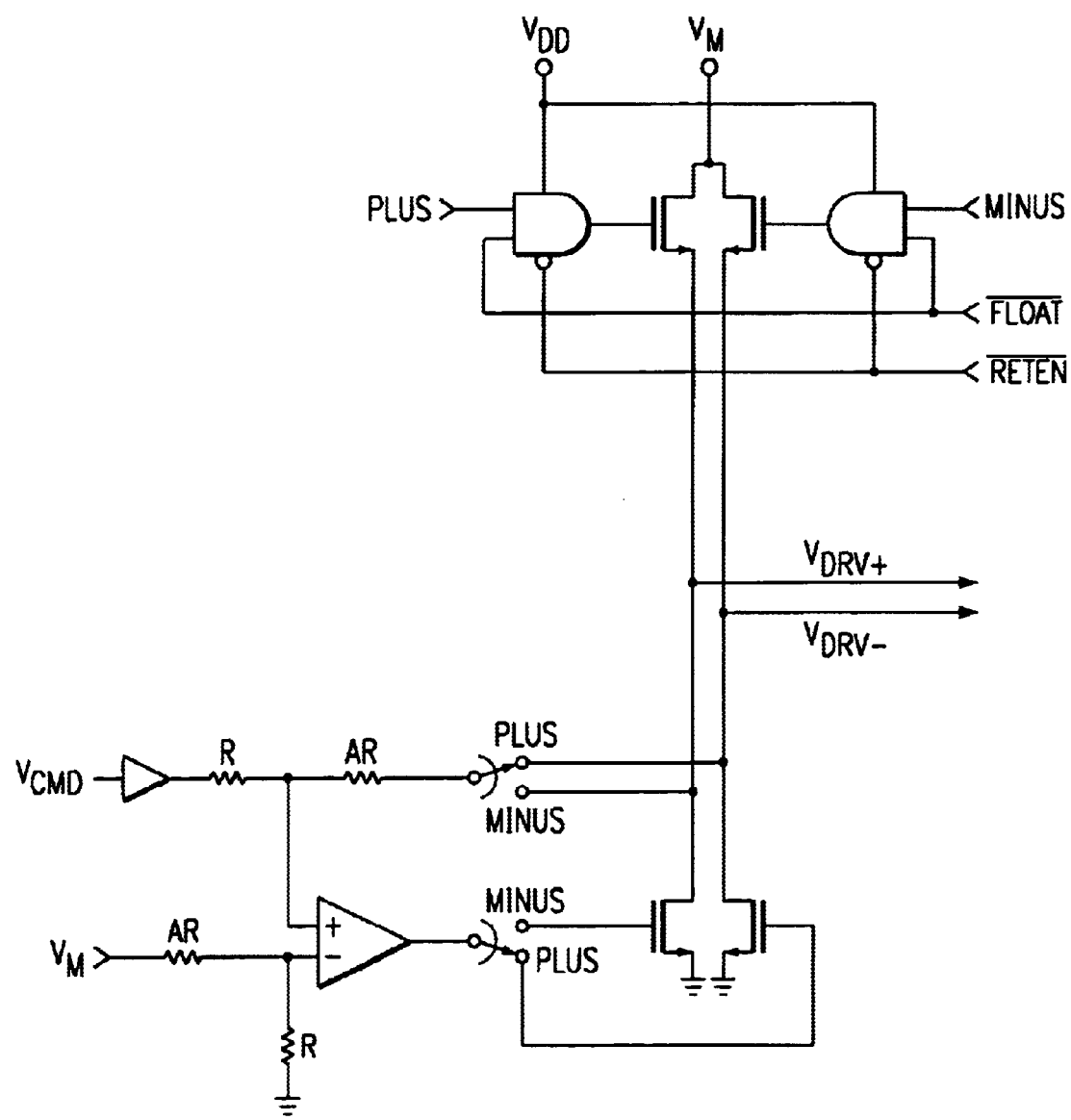
FIG. 8 illustrates a drive circuit used with the control circuit of FIG. 6.

FIG. 8 illustrates a drive circuit to be used in conjunction with the control circuit of FIG. 6.

I claim:

1. A apparatus for controlling an actuator, comprising:
   an integrator circuit to generate an integrated signal to be represented by a back EMF voltage;
   a amount circuit to generate a amount signal to indicate the amount to raise or lower the integrated voltage;
   a direction circuit to generate a direction signal to raise or lower the back EMF voltage;
   a comparator circuit to compare said integrated voltage with said back EMF voltage; and
   a switch circuit to add and subtract said amount signal with said integrated voltage in accordance with said direction signal;
   wherein said amount circuit includes a capacitor having a voltage indicative of said amount signal; and
   wherein said capacitor is charged in accordance with an output of a NAND gate.

2. A apparatus for controlling an actuator as in claim 1, wherein said integrator circuit includes an up/down counter.

3. A apparatus for controlling an actuator as in claim 1, wherein said capacitor is a single capacitor.

4. A apparatus for controlling an actuator as in claim 1, wherein said NAND gate operates with an output signal of said comparator circuit.

* * * * *